US008863510B2

(12) United States Patent
Schmidt

(10) Patent No.: US 8,863,510 B2
(45) Date of Patent: Oct. 21, 2014

(54) ELECTROHYDRAULIC ACTUATOR WITH A PUMP INCORPORATED IN THE PISTON

(75) Inventor: Robert Kyle Schmidt, Cheltenham (GB)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 978 days.

(21) Appl. No.: 12/999,577

(22) PCT Filed: Jun. 12, 2009

(86) PCT No.: PCT/FR2009/000701
§ 371 (c)(1),
(2), (4) Date: Mar. 4, 2011

(87) PCT Pub. No.: WO2009/153444
PCT Pub. Date: Dec. 23, 2009

(65) Prior Publication Data

US 2011/0146262 A1 Jun. 23, 2011

(30) Foreign Application Priority Data

Jun. 17, 2008 (FR) ..................................... 08 03370

(51) Int. Cl.
*F16D 31/02* (2006.01)
*F15B 15/18* (2006.01)
*F15B 15/14* (2006.01)

(52) U.S. Cl.
CPC ....... *F15B 15/18* (2013.01); *F15B 2211/20538* (2013.01); *F15B 2211/785* (2013.01); *F15B 2211/20515* (2013.01); *F15B 15/1466* (2013.01); *F15B 2211/20561* (2013.01); *F15B 15/1447* (2013.01)
USPC ............................................... 60/475; 60/476

(58) Field of Classification Search
USPC ........................................... 60/473, 475, 476
See application file for complete search history.

(56) References Cited

U.S. PATENT DOCUMENTS

| | | | | |
|---|---|---|---|---|
| 2,631,431 | A * | 3/1953 | Grebe | 60/477 |
| 2,918,795 | A * | 12/1959 | Marien | 60/475 |
| 2003/0077183 | A1 | 4/2003 | Franchet et al. | |
| 2008/0289327 | A1 * | 11/2008 | Mintgen et al. | 60/477 |

FOREIGN PATENT DOCUMENTS

| | | | |
|---|---|---|---|
| FR | 2 831 226 | A1 | 4/2003 |
| WO | 2006/040090 | A1 | 4/2006 |

* cited by examiner

*Primary Examiner* — Edward Look
*Assistant Examiner* — Daniel Collins
(74) *Attorney, Agent, or Firm* — Sughrue Mion, PLLC

(57) ABSTRACT

The invention relates to an electrohydraulic actuator comprising a body (1) that defines a cylindrical cavity (2) in which a piston (3) slides in leaktight manner and divides an inside volume of the cavity into two chambers (A, B) of variable volume, the piston being associated with at least one rod (4) passing in leaktight manner through an end wall of the cavity, the actuator including a bidirectional pump (5) having two ports (P1, P2), each connected to one of the chambers, an electric motor (8) for selectively driving the pump in one direction or the other, the pump being placed inside the piston of the actuator so as to move together therewith. According to the invention, the motor is placed at the end of the actuator and drives a shaft of non-circular section (6) extending through the cavity parallel to a sliding direction of the piston (3) and of the rod (4), the shaft passing through the piston (3) to co-operate with a complementary drive member (11; 21) of the pump that slides freely along the shaft during movements of the rod but that is driven in rotation when the shaft turns under drive from the electric motor.

3 Claims, 1 Drawing Sheet

1
2
3
4
5
6
8
9
11
12
13
21
22
23
A
B
P1
P2
II
X

ELECTROHYDRAULIC ACTUATOR WITH A PUMP INCORPORATED IN THE PISTON

CROSS REFERENCE TO RELATED APPLICATIONS

This application is a National Stage of International Application No. PCT/FR2009/000701 filed Jun. 12, 2009, claiming priority based on French Patent Application No. 08 03370 filed Jun. 17, 2008, the contents of all of which are incorporated herein by reference in their entirety.

The invention relates to an electrohydraulic actuator with a pump incorporated in the piston.

BACKGROUND OF THE INVENTION

Electrohydraulic actuators are known that comprise a body defining a cylindrical cavity in which a piston slides in leaktight manner and divides the inside of the cavity into two chambers. The piston is associated with at least one rod that passes through one of the end walls of the body. The actuator also includes a bidirectional pump that is actuated by an electric motor and that includes two ports, each connected to a respective one of the chambers of the cylinder. The pump serves to transfer fluid from one chamber to the other so as to cause the piston, and thus the rod, to move, with the quantity of fluid corresponding to the volume difference between the chambers being supplied or absorbed by a compensation member, e.g. an accumulator.

Such electrohydraulic actuators are generally relatively bulky since the electric motor and the pump are located beside the cylinder.

For example, document FR 2 831 226 discloses elongate electrohydraulic actuators in which the motor, the pump, and the accumulator are placed in line with the cylinder. Ducts pierced through the walls of the cylinder enable the ports of the pump to be connected to both chambers.

Document U.S. Pat. No. 2,918,795 also discloses an electrohydraulic actuator in which the pump and the motor are provided within the piston of the actuator, each of the ports of the chamber opening out directly into a respective one of the chambers of the actuator. That arrangement is very compact, but the motor is completely immersed, and if it fails it is difficult to replace since it is necessary to disassemble the actuator entirely.

OBJECT OF THE INVENTION

An object of the invention is to provide an electrohydraulic actuator that is compact while nevertheless being easy to maintain.

BRIEF DESCRIPTION OF THE INVENTION

In order to achieve this object, the invention proposes an electrohydraulic actuator comprising a body that defines a cylindrical cavity in which a piston slides in leaktight manner and divides an inside volume of the cavity into two chambers of variable volume, the piston being associated with at least one rod passing in leaktight manner through an end wall of the cavity, the actuator including a bidirectional pump having two ports, each connected to one of the chambers, an electric motor for selectively driving the pump in one direction or the other, the pump being placed inside the piston of the actuator so as to move together therewith, each of the ports opening out directly into a respective one of the chambers.

According to the invention, the electric motor is placed at the end of the actuator and drives a shaft of non-circular section in rotation, which shaft extends inside the cylinder, passing through the piston, the pump having a complementary drive member that is free to slide along the shaft during the movements of the rod, but that is driven in rotation when the shaft turns under drive from the electric motor.

Thus, although the pump remains incorporated inside the cylinder between the chambers, its motor remains at one end and can therefore easily be removed in the event of failure, where statistically speaking failure of the motor is more probable than failure of the pump.

BRIEF DESCRIPTION OF THE FIGURES

The invention can be understood in the light of the following description of the figures of the accompanying drawing, in which.

DETAILED DESCRIPTION OF THE INVENTION

Figures 1, 2, 3:
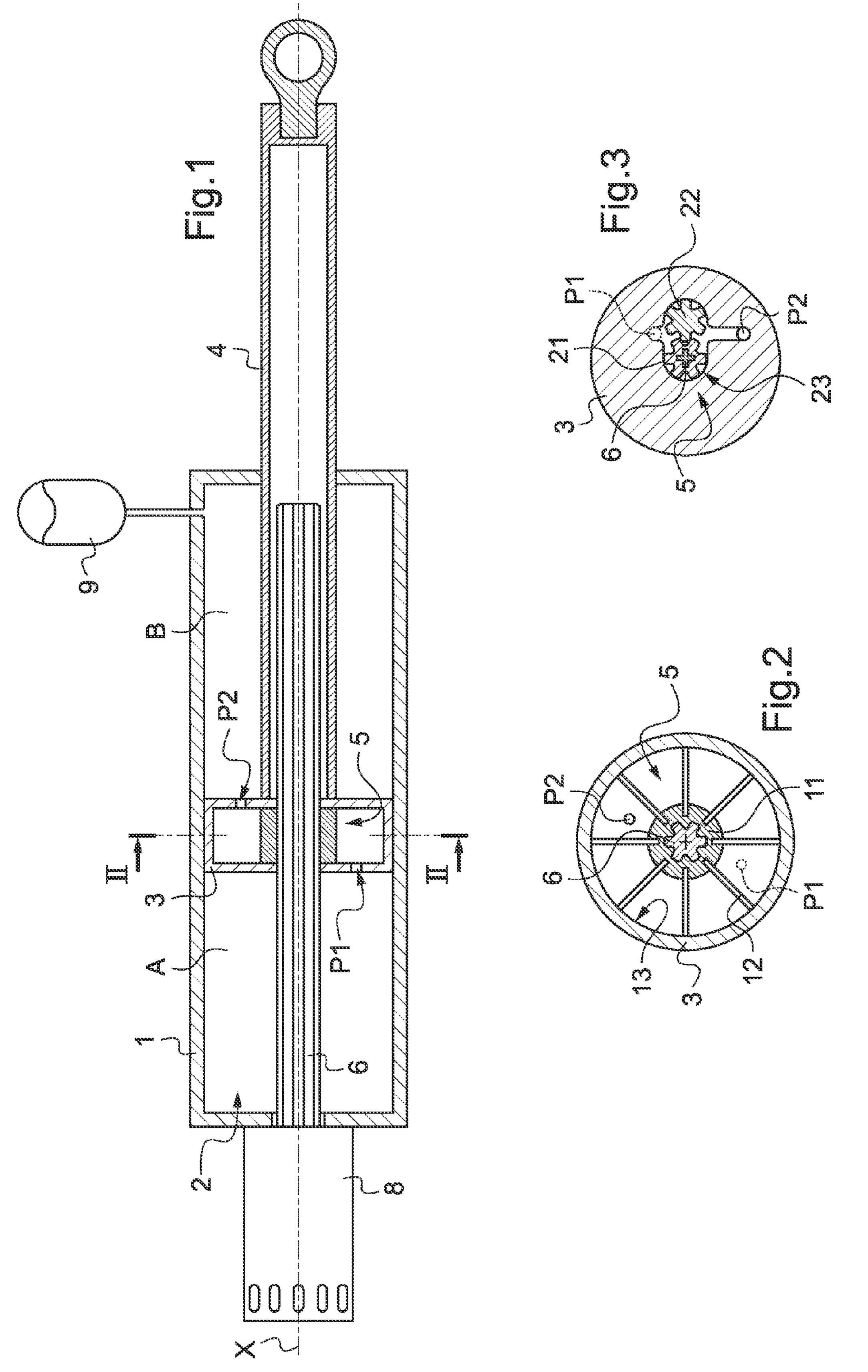
FIG. 1 is a section view of an actuator in a particular embodiment of the invention.
FIG. 2 is a section view on line II-II of FIG. 1 showing the pump-incorporating piston of the actuator.
FIG. 3 is a section view analogous to that of FIG. 2, showing a variant embodiment of the invention.

With reference to FIG. 1, and in accordance with the invention, the actuator comprises a body 1 that defines a cylindrical cavity 2 extending along a longitudinal axis X. A piston 3 is mounted to slide in leaktight manner in the cylindrical cavity and defines therein two hydraulic chambers A and B. The piston 3 is associated with a rod 4 that passes through an end wall of the body 1 in leaktight manner. The various gaskets that ensure sealing as mentioned above are not shown.

A bidirectional pump 5 is disposed directly in the piston 3. The bidirectional pump 5 has two ports P1 and P2 that open into respective ones of the chambers A and B.

In known manner, the bidirectional pump 5 includes a rotary member (e.g. a cylinder barrel, a gear, a hub, . . . ) that need only be driven in rotation in order to cause fluid to be transferred from one chamber to the other, thereby causing the piston 3 to move within the cylindrical cavity 2.

To this end, and according to the invention, the actuator includes a fluted shaft 6 that extends within the cylindrical cavity 2 parallel to the axis X and that is driven in rotation by means of an electric motor 8 located outside the cavity 2. The fluted shaft 6 passes through the piston 3, which is capable of sliding freely along the fluted shaft 6. Rotation of the fluted shaft 6 under drive from rotation of the electric motor 8 causes the rotary member of the bidirectional pump 5 to rotate, thereby causing fluid to be transferred from one chamber to the other, and thus causing the piston 3 to move in the cylindrical cavity 2.

The actuator includes compensation means for compensating for a difference in flow rate between the two chambers while the piston 3 is moving in the cavity 2. In this example, the compensation means comprise an accumulator 9 that is hydraulically connected to the chamber B. The surplus fluid that passes from the chamber A to the chamber B when the rod 4 is pushed in is recovered in the accumulator 9. Conversely, the deficit of fluid passing from the chamber B to the chamber A in the event of the rod 4 being pulled out is provided by the accumulator 9.

As shown in FIG. 2, the bidirectional pump 5 in the example shown is of the vane pump type. The bidirectional pump 5 comprises a central hub 11 with internal fluting that is driven in rotation by the fluted shaft 6 and that carries vanes 12 (only one of the vanes has a reference) that co-operate with an inside wall 13 of the piston 3 and with the inside flanks thereof to define volumes that enable fluid to be transferred from one of the ports to the other.

In a variant shown in FIG. 3, the bidirectional pump 5 is of the gear type. It comprises an internally fluted driving gear 21 that is driven in rotation by the fluted shaft 6, and that co-operates with a driven gear 22. The two gears 21 and 22 co-operate in leaktight manner with an inside wall 23 so as to define volumes serving to transfer fluid from one of the ports to the other.

In FIGS. 2 and 3, the port P1 that is carried by the wall of the piston that is not visible in the section is drawn in dotted lines.

The invention is naturally not limited to the above description, but on the contrary covers any variant coming within the ambit defined by the claims.

In particular, it is possible to use any type of hydraulic pump providing it can be integrated in the piston of the rod. Furthermore, although the shaft 6 is shown as being fluted, it could more generally present a non-circular section adapted to impart rotary drive to a complementary drive member of the pump with which it co-operates. In addition, it is possible to add an electrical valve between the accumulator and the associated chamber so as to avoid pressurizing the chambers in the absence of electricity.

What is claimed is:

1. An electrohydraulic actuator comprising a body (1) that defines a cylindrical cavity (2) in which a piston (3) slides in leaktight manner and divides an inside volume of the cavity into two chambers (A, B) of variable volume, the piston being associated with at least one rod (4) passing in leaktight manner through an end wall of the cavity, the actuator including a bidirectional pump (5) having two ports (P1, P2), each connected to one of the chambers, an electric motor (8) for selectively driving the pump in one direction or the other, the pump being placed inside the piston of the actuator so as to move together therewith, each of the ports opening out directly into one of the chambers of the actuator, wherein the motor is placed at the end of the actuator and drives a shaft of non-circular section (6) extending through the cavity parallel to a sliding direction of the piston (3) and of the rod (4), the shaft passing through the piston (3) to co-operate with a complementary drive member (11; 21) of the pump that slides freely along the shaft during movements of the rod but that is driven in rotation when the shaft turns under drive from the electric motor.

2. An actuator according to claim 1, wherein the drive member is a hub (11) driving vanes (12).

3. An actuator according to claim 1, including a compensation member (9) for compensating a flow rate difference between the chambers (A, B) of the actuator during movement of the piston.

* * * * *